United States Patent
Summach

[19]

[11] Patent Number: 6,120,066
[45] Date of Patent: Sep. 19, 2000

[54] SPLIT TUBE JUNCTION FORM AND METHOD OF USE

[75] Inventor: Harley Robert Summach, Ashton, Canada

[73] Assignee: Nortel Networks Corporation, Montreal, Canada

[21] Appl. No.: 09/178,885

[22] Filed: Oct. 27, 1998

[51] Int. Cl.[7] .................................................. F16L 11/118
[52] U.S. Cl. ....................... 285/149.1; 285/420; 403/217; 403/218
[58] Field of Search ................................. 285/125.1, 420, 285/424; 403/217, 218; 248/68.1, 49

[56] References Cited

U.S. PATENT DOCUMENTS

| | | | |
|---|---|---|---|
| 3,048,358 | 8/1962 | Raulins et al. ............................ | 248/49 |
| 3,571,863 | 3/1971 | Logan ..................................... | 248/68.1 |
| 4,443,031 | 4/1984 | Borsh et al. . | |
| 4,557,510 | 12/1985 | Overmyer . | |
| 4,836,580 | 6/1989 | Farrell . | |
| 5,352,855 | 10/1994 | Potter ..................................... | 285/420 |
| 5,661,840 | 8/1997 | Caveney . | |
| 5,901,756 | 5/1999 | Goodrich ............................... | 248/68.1 |

Primary Examiner—Lynne H. Browne
Assistant Examiner—Aaron Dunwoody

[57] ABSTRACT

The present invention provides a junction form which may be used to provide junctions in split tube used to protect optical fibers. The form consists of a base with multiple arms extending therefrom, with retainers at the base and at the ends of the arms. These retainers engage edges in the split tubes formed by the split found initially in the split tubes, and by a second split formed at the ends of the split tubes opposite the original split. The junction created by the junction form protects the optical fibers against being bent at a sharp angle, while allowing the optical fiber to be installed therein by simply pushing the fibers into the junction and the split tube. The present invention also provides methods of creating junctions from split tubes.

17 Claims, 8 Drawing Sheets

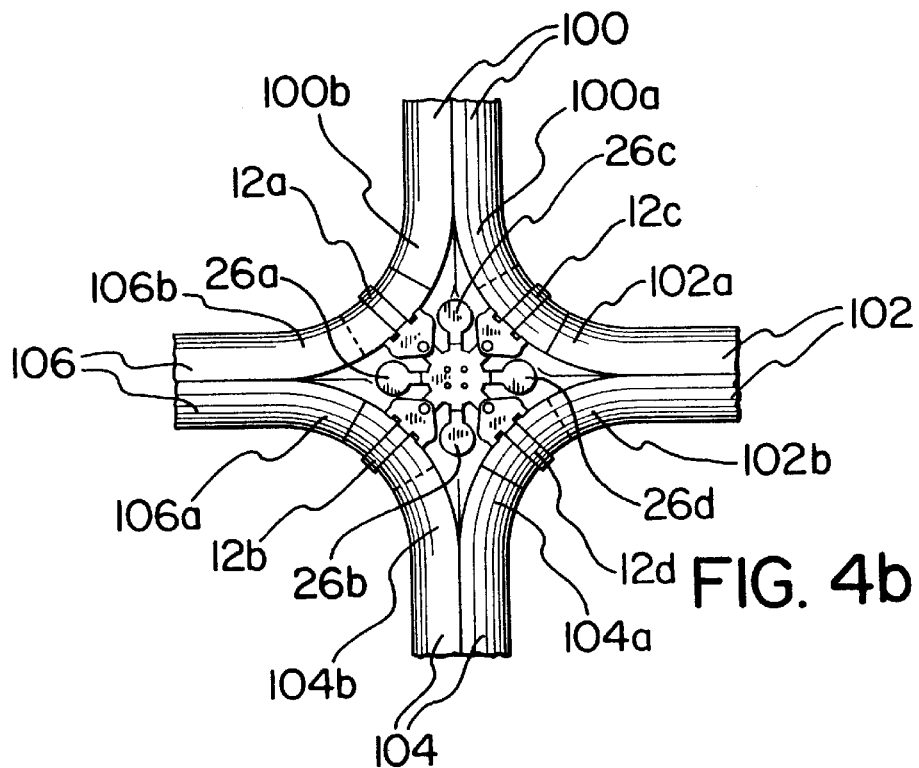
FIG. 4b
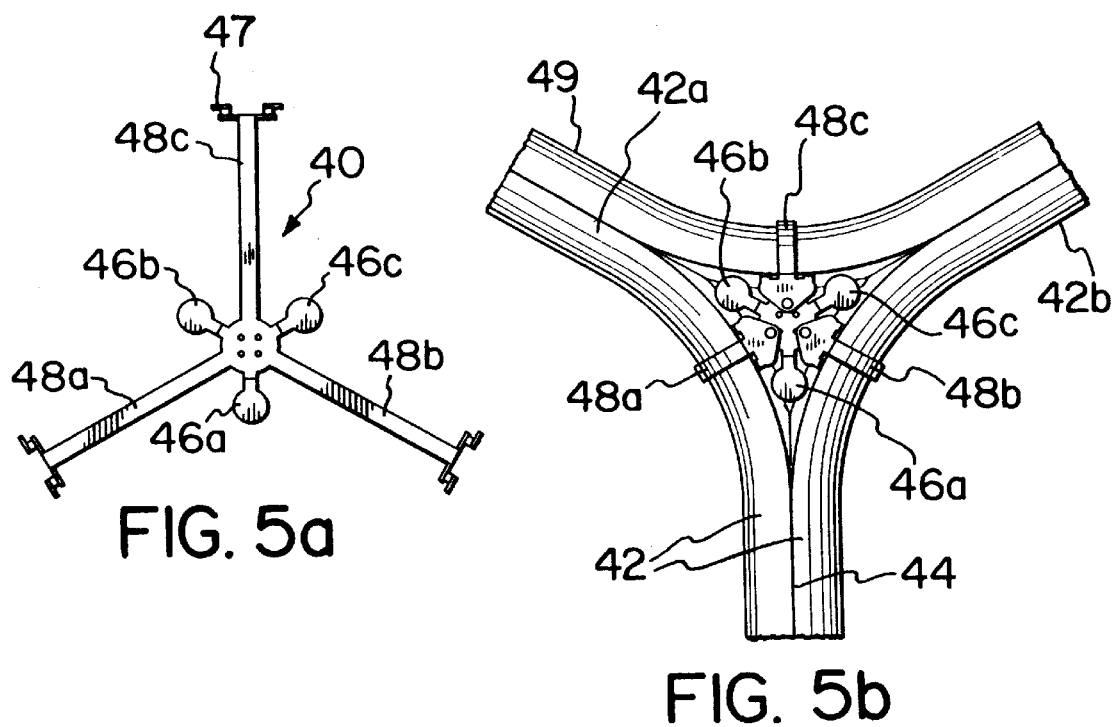
FIG. 5a
FIG. 5b

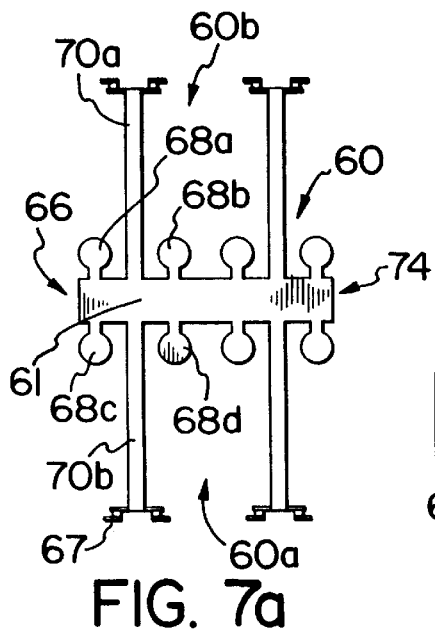
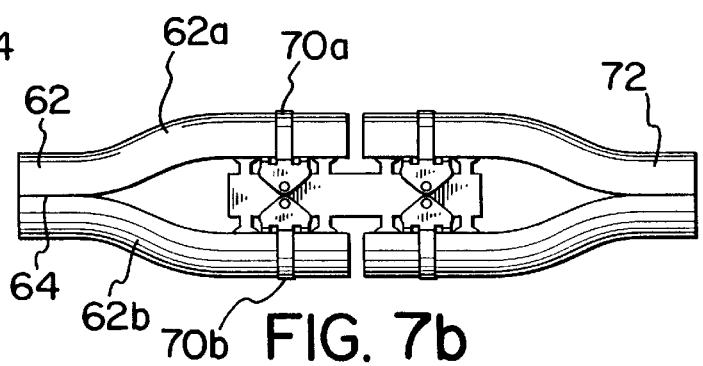
FIG. 7a  FIG. 7b
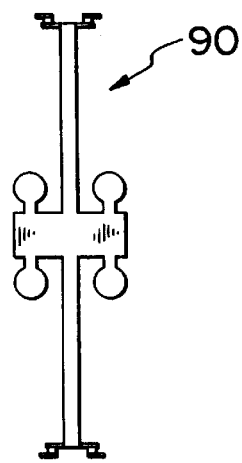
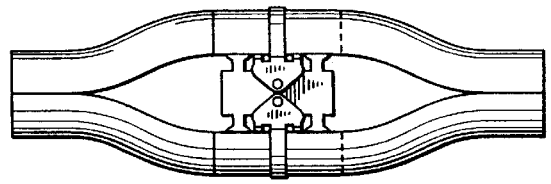
FIG. 8a  FIG. 8b

SPLIT TUBE JUNCTION FORM AND METHOD OF USE

FIELD OF THE INVENTION

The present invention relates to junction forms, and more particularly to forms used to provide junctions for split tube in optical fiber shielding applications, and to methods for creating junctions in split tubes.

BACKGROUND OF THE INVENTION

Flexible conduits, and in particular corrugated plastic conduits are often used in the electronics and telecommunications industries to protect optical fiber. Optical fiber is sensitive to excessive strain, and damage may occur if it is allowed to be bent at a sharp angle. The corrugated plastic conduits prevent such damage by limiting the angle at which the fibers may be bent, while at the same time also protecting the fibers against damage caused by contact with other objects.

Corrugated plastic conduits may be either closed tube, or split tube, the latter having a longitudinal split provided on one side. Split tube provides an advantage over closed tube in that while closed tube requires that the optical fibers be threaded through the tube during installation, with split tube, the fibers may simply be pushed into the tubes through the longitudinal split. This facilitates installation of the fibers within the tubes.

In connecting several devices, it is desirable to have optical fiber conduits which accommodate a complex network of fiber connections. Such a complex network requires junctions between the conduits shielding the fibers, such as cross junctions, T-junctions and Y-junctions. At present, no simple method of providing such junctions in split tube exists.

Optical fiber junction boxes, where several conduits bring optical fibers into a junction box, are known. Such a junction box is disclosed in U.S. Pat. No. 5,661,840 granted to Caveney on Aug. 26, 1997. However, such junction boxes require a great deal of space, which space is often not available in the area behind or between the devices to be interconnected. Further, no effective method of preventing the fibers from bending at sharp angles is provided, since once a fiber leaves the conduit, it is no longer protected against such bending. Such junction boxes are also complex devices, and are therefore expensive. Finally, during installation of the fibers, such junction boxes do not permit the user to simply push the fibers into them.

SUMMARY OF THE INVENTION

According to a broad aspect, the present invention provides a junction form comprising: at least three semi-rigid arms extending radially from an intersection of said arms, each arm having a first end near the intersection, and a second end remote from said intersection, each of said arms being bendable from a first position in which the arm extends outward from said intersection, to a second position in which the second end of the arm is substantially located above the first end; and said second end of each arm being provided with a top retainer for engaging an edge formed by the first longitudinal split in the conduit, whereby junctions in flexible conduits having a first and a second longitudinal split at an end may be formed by placing the flexible conduits on the arms of the junction form with the first longitudinal split facing up, bending the arms to their second positions and positioning the top retainers to engage the edges formed by the first longitudinal splits in the flexible conduits.

According to another aspect, the present invention provides a junction form for joining a first and second flexible conduit each having at least a first longitudinal split at an end, comprising: a base having a left side and a right side; at least one arm extending outward from each of the left side and right side of said base; each arm having a first end attached to the base, and a second end remote from the base, each of said arms being bendable from a first position in which the arms extend outward from said base, to a second position in which the second end of the arm is substantially located above the first end; and said second end of each arm being provided with top retainers for engaging an edge formed by the first longitudinal split in the conduits, whereby with the two ends of the flexible conduit placed on the base with the first longitudinal split of each flexible conduit facing up, the arms may be bent to their second positions and their top retainers positioned to engage the edges formed by the first longitudinal split in the flexible conduits.

According to another aspect, the present invention provides a method of using such a junction form wherein the flexible conduit is split tube and the first longitudinal split consists of the split formed in the split tube, and wherein the junction form further comprises bottom retention means for engaging edges formed by a second longitudinal split in the split tube, the method comprising the following steps: (a) providing a longitudinal split at the end of each split tube radially opposite the first longitudinal split, to form the second longitudinal split; (b) placing the edges formed by the second longitudinal split in each split tube in the bottom retention means; (c) bending each arm from its first position to its second position; and (d) inserting the edges formed by the first longitudinal split in each split tube in the top retention means, wherein step (a) is performed before steps (b), (c) and (d).

According to a further aspect, the present invention provides a method of forming a cross junction in flexible split tube comprising the following steps: (a) providing a longitudinal split at the end of each of a first and a second split tube, radially opposite the split initially formed in the split tubes, creating two halves at the end of each split tube; (b) placing and retaining one half of the first split tube against one half of the second split tube; and (c) placing and retaining the other half of the first split tube against the other half of the second split tube, wherein step (a) is performed before steps (b) and (c).

Advantageously, the junctions created in accordance with the invention, whether through use of the junction form or not, requires very little space, and may therefore easily fit within confined areas. Also, because the fibers always remain within the flexible conduits, they are prevented from being bent at sharp angles, and are also protected against damage caused by contact with other objects. Further, the split tube junction form of the present invention allows installation of the optical fibers, including connections of optical fibers, by simply pushing the fibers into the junction form. Finally, the split tube junction form of the present invention is very simple, and is therefore inexpensive.

Other objects, features and advantages will be apparent from the following detailed description taken in connection with the accompanying sheets of drawings.

BRIEF DESCRIPTION OF THE DRAWINGS

Preferred embodiments of the invention will now be described with reference to the attached drawings in which:

FIG. 4b is a top view of the split tube junction form of FIG. 1 with all four arms in a second position, and with four split tubes installed therein to form a cross junction;

FIG. 5a is a top view of a split tube junction form according to another embodiment of the invention with the arms in a first position;

FIG. 5b is a top view of the split tube junction form of FIG. 5a with the arms in a second position and with split tubes installed therein to form a "Y" junction;

FIG. 7a is a top view of a split tube junction form according to a further embodiment of the invention with the arms in a first position; and FIG. 7b is a top view of the split tube junction form of FIG. 7a with the arms in a second position and with split tubes installed therein to form a linear joint.

FIG. 8a is a top view of a split tube junction form according to a further embodiment of the invention with the arms in a first position; and FIG. 8b is a top view of the split tube junction form of FIG. 8a with the arms in a second position and with split tubes installed therein to form an overlapping linear joint.

DETAILED DESCRIPTION OF THE DRAWINGS

Figure 1A:
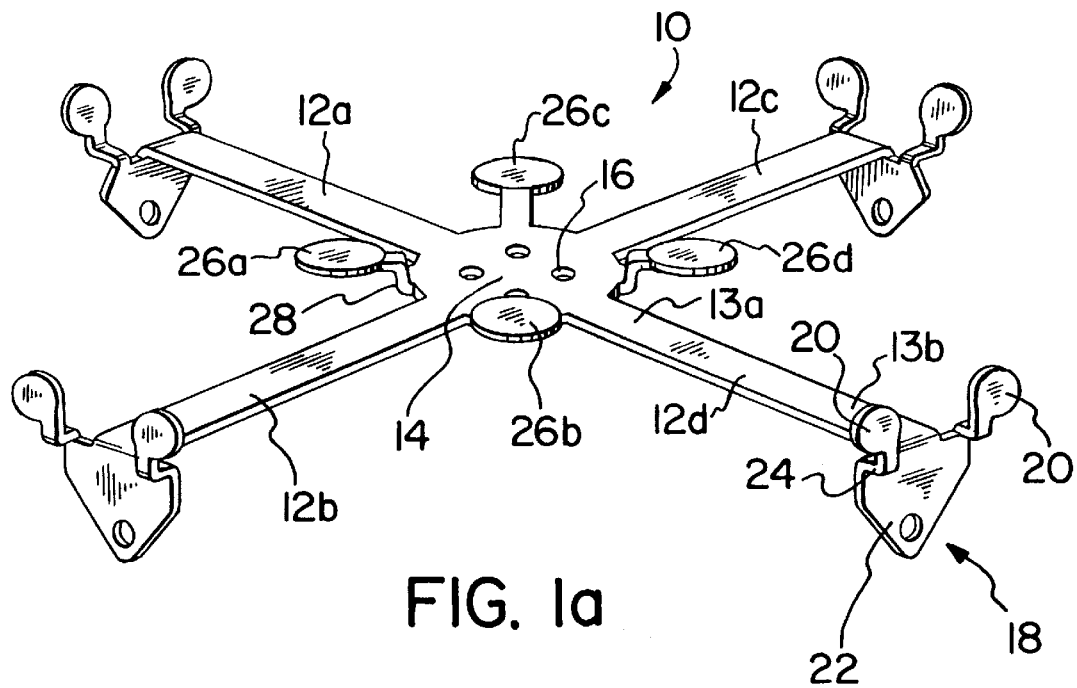
FIG. 1a is a top perspective view of a split tube junction form according to an embodiment of the invention with arms in a first position.
Figure 1B:
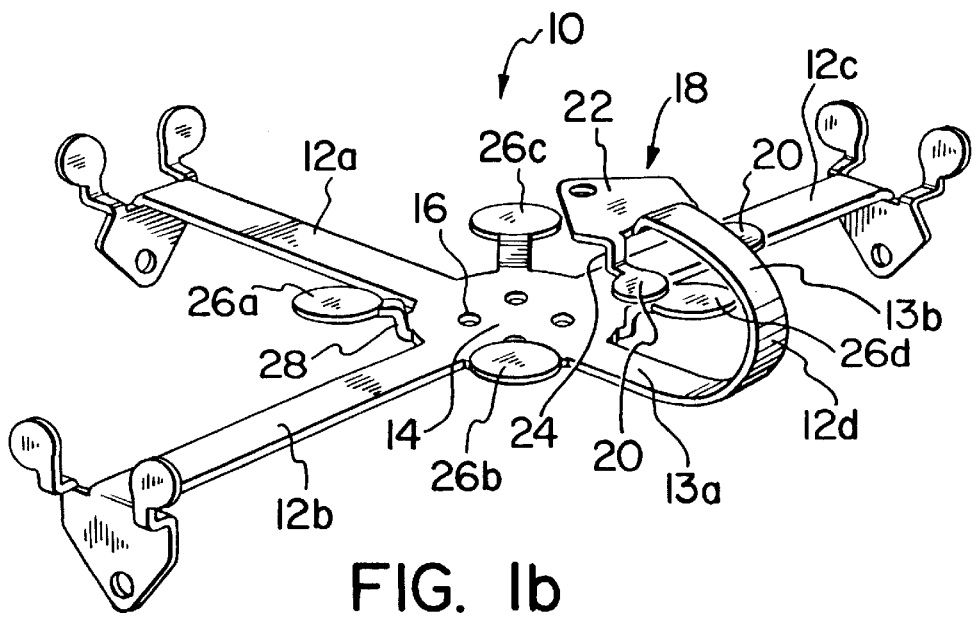
FIG. 1b is a top perspective view of the split tube junction form of FIG. 1 with one of the arms in a second position and a top retaining element at a second end of the arm bent downwards.
Figure 2:
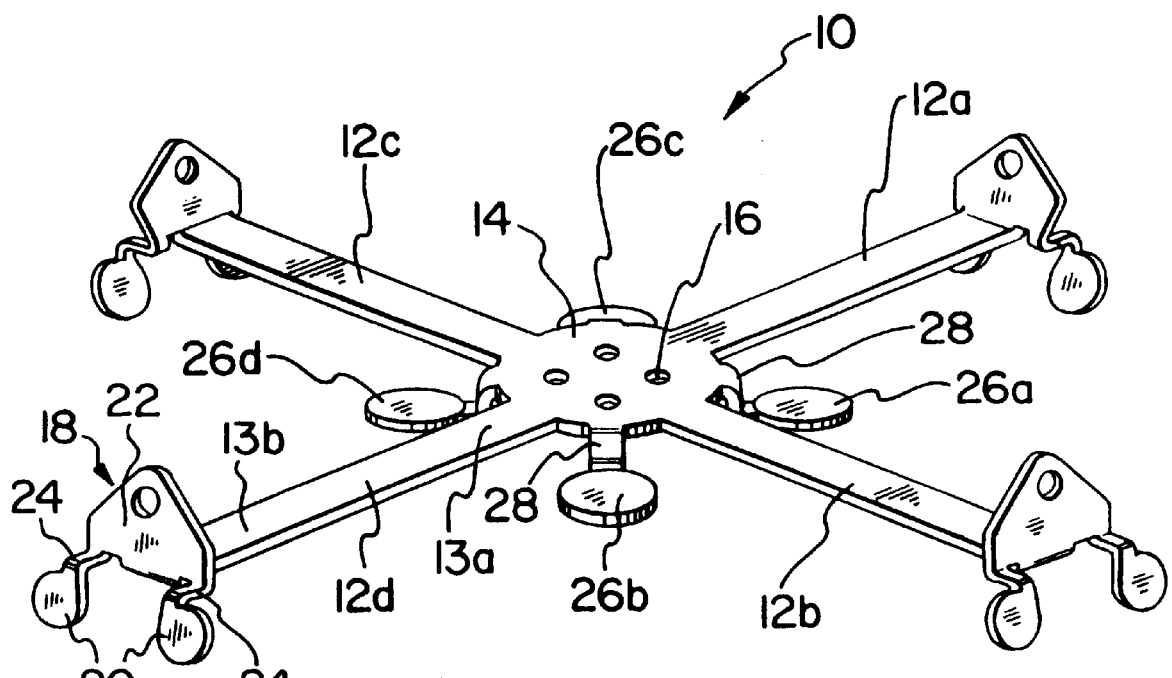
FIG. 2 is a bottom perspective view of the split tube junction form of FIG. 1.
Figure 3:
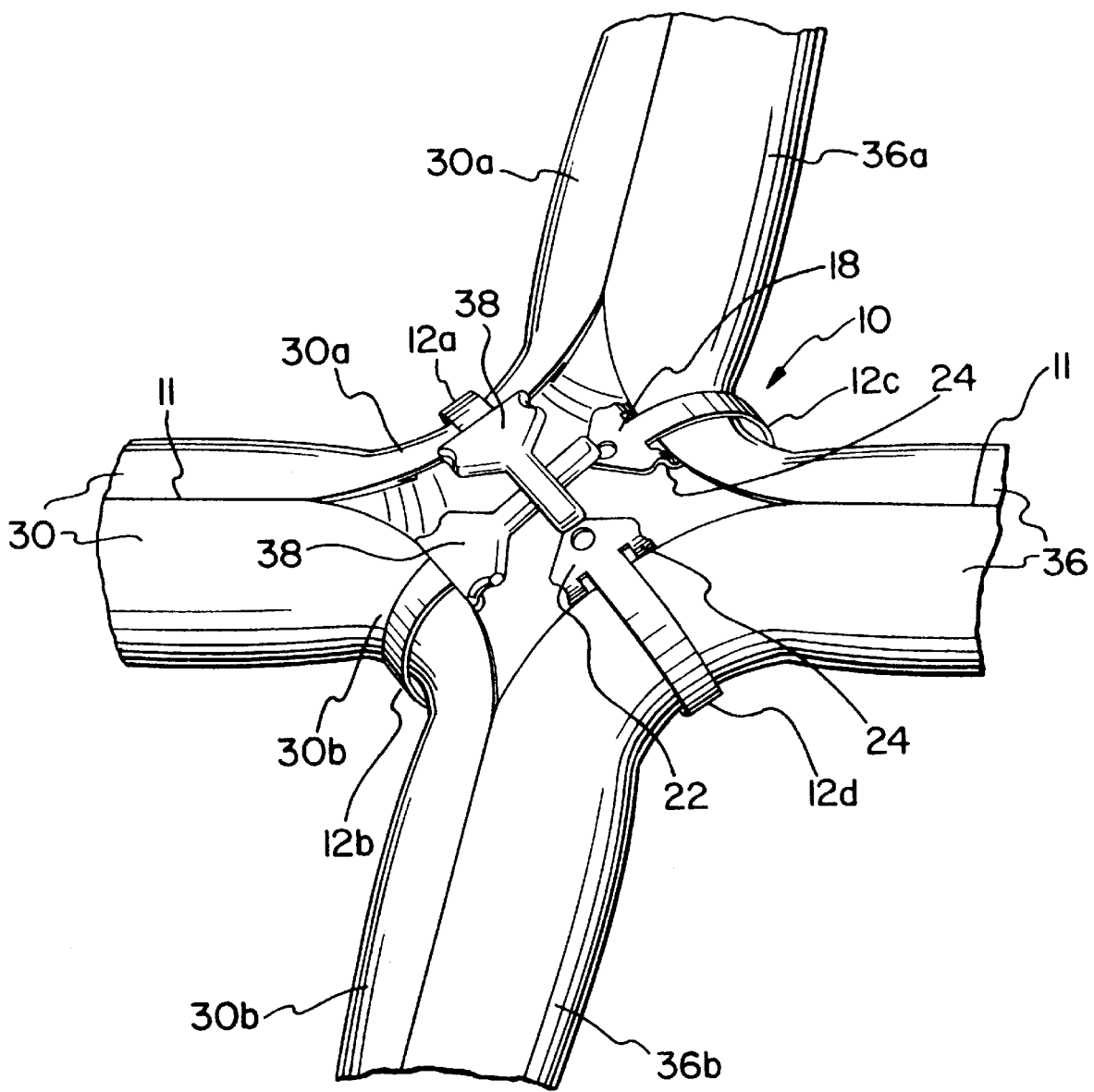
FIG. 3 is a top perspective view of the split tube junction form of FIG. 1 with all four arms in a second position, and with two split tubes installed therein to form a cross junction.
Figure 4A:
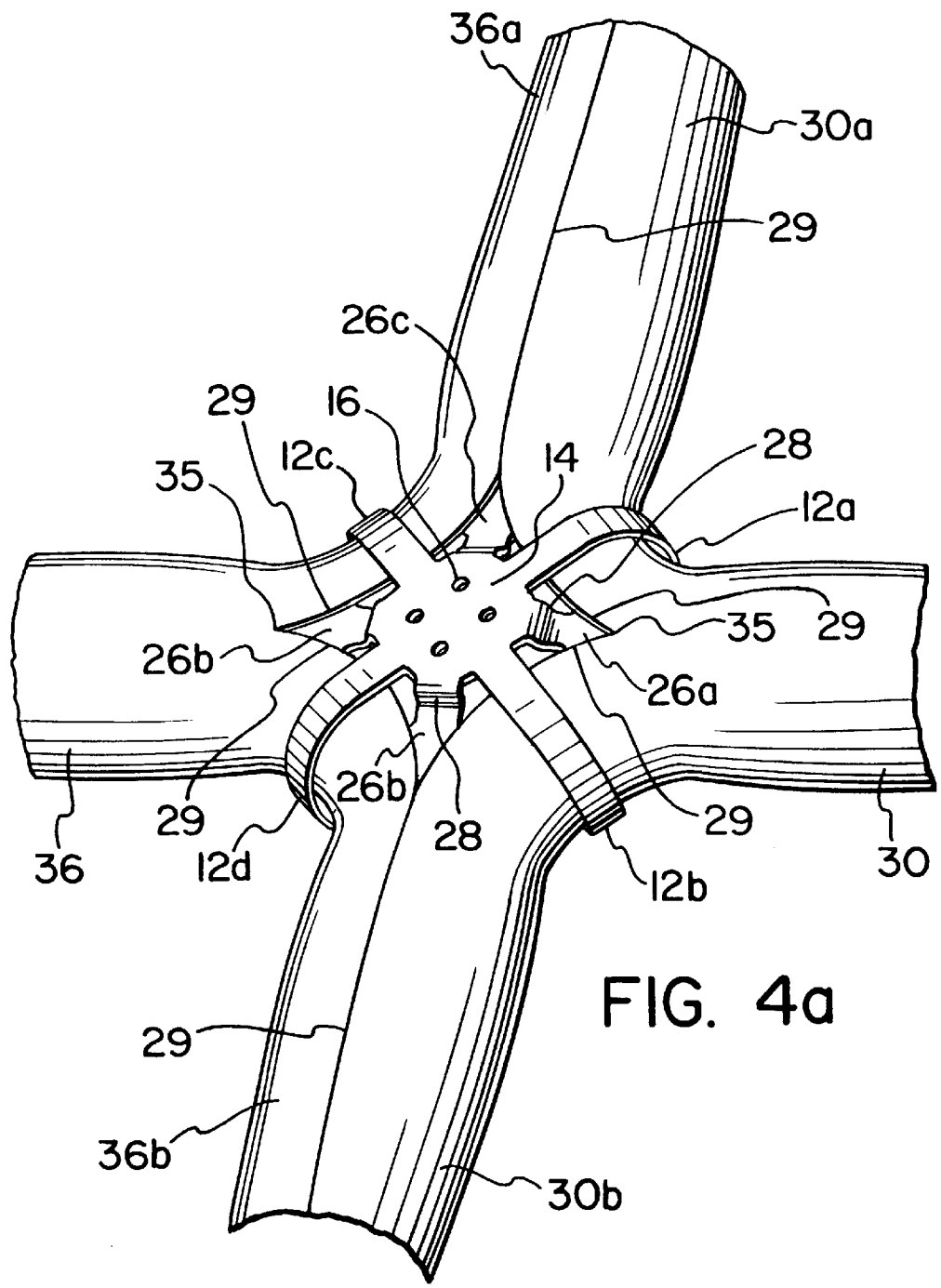
FIG. 4a is a bottom perspective view of the split tube junction form of FIG. 3.

A split tube junction form 10 according to an embodiment of the present invention is shown in FIGS. 1a, 1b and 2, and may be used to form a cross junction as shown in FIGS. 3, 4a and 4b, using two split tubes 30, 36 each having first longitudinal splits 11. In this embodiment, the split tube junction form 10 may generally be described as having four arms 12a–d extending radially in a cross configuration, from an intersection of the arms. FIGS. 1a and 2 show the split tube junction form 10 with the arms 12a–d in a first position. FIG. 1b shows the split tube junction form with one arm 12d in a second position, while FIGS. 3 and 4a show the split tube junction form with split tubes 30, 36 installed therein and with all four arms 12a–d in the second position.

In the preferred embodiment, a circular base 14 is located at the intersection of the arms. In this description, the terms "outward" and "inward" are used respectively to define directions away from and towards an imaginary line perpendicular to a plane defined by the base.

As shown in FIGS. 1a and 2, the base 14 is generally flat and is provided with holes 16 for mounting the split tube junction form 10 to another surface such as a wall, or to another split tube junction form. The base may be mounted to such other surfaces by use of screws, nails, etc. Each arm 12a–d is preferably identical in shape and function and arm 12d will be described in detail by way of example. Preferably, the arm 12d is generally flat, and is semi-rigid, allowing the arm to be bent to assume a particular shape, and to retain that shape. In its first position, the arm 12d is coplanar with, and extends radially from the base 14, with a first end 13a near the base, and a second end 13b remote from the base.

The arm 12d is provided at its second end 13b with a top retention element 18 which initially lies in a pair of planes perpendicular to the arm 12d. The top retention element 18 consists of two top retention tabs 20 mounted on a fiber retainer 22. Each top retention tab 20 is generally flat with a round profile, and is mounted to the fiber retainer 22 through an "S"-shaped connecting strip 24 such that the top retention tabs lie on a plane just outside the plane defined by the fiber retainer. The fiber retainer 22 is generally flat and has a spade-shaped profile pointing downward.

Four bottom retention tabs 26a–d are mounted to the base 14, each bottom retention tab extending radially outward from the base between each pair of adjacent arms 12a–d. These bottom retention tabs 26a–d are generally flat with a round profile, and are mounted to the base 14 through an "S"-shaped connecting strip 28 such that the bottom retention tabs lie on a plane just above the plane defined by the base. These bottom retention tabs 26a–d in cooperation with the arms 12a–d comprise bottom retainers for engaging an edge formed by a second longitudinal split 29 provided in the split tubes, as further described below.

Each arm 12a–d is adapted to be bent from its first position as shown in FIGS. 1a and 2, in which the arm is co-planar with, and extends radially from the base 14, to its second position as shown with one arm 12b in FIG. 1b, and with all four arms 12a–d in FIGS. 3 and 4a, in which the second end 13b of the arm has been bent upward and inward such that the second end of the arm is substantially located above the first end 13a of the arm, and the arm assumes a "C" shaped appearance. Once the arm 12a–d has been bent to this second position, the arm retains its position by virtue of the semi-rigid nature of the arm. Of course, the arms 12a–d may be bent back to their first positions such that the split tube junction form 10 may be re-used elsewhere. Each arm 12a–d is of sufficient length to permit the arm to extend around an outside surface of one half of a split tube to be joined, as shown in FIGS. 3 and 4a.

Once the arm 12a–d has been bent into its second position, as shown in FIGS. 3 and 4a, the top retention element 18 may be bent downward such that the top retention tabs 20 are substantially parallel to the base 14 and point outward, while the fiber retainers 22 are also substantially parallel to the base and point inward. The top retention tabs 20 in cooperation with the arms 12a–d provide top retainers for engaging an edge formed by the first longitudinal splits 11 of the split tubes as described further below. If desired, owing to the semi-rigid nature of the arms 12a–d, once the top retention elements 18 have been bent downward, the arms may then be bent outward to hold the split tube in an open position to facilitate insertion of optical cabling, This embodiment of the split tube junction form 10 is stamped from galvanized steel, and then bent to assume the configuration described above and shown in FIGS. 1a and 2. The steel is coated in plastic to provide electrical insulation and to protect the split tubes and optical fibers from damage which might otherwise be caused through contact with the split tube junction form 10. It is to be understood however, that the split tube junction form 10 of the present invention may be constructed of other materials, plastic, or other metals for example.

In use, the preferred embodiment of the split tube junction form 10 shown in FIGS. 1a and 2 may be used to join two split tubes to form a cross junction.

As seen in FIGS. 3 and 4a, the end of the first split tube 30 is first provided with a second longitudinal split 29 on the side opposite the first longitudinal split 11 already provided on the split tube. This second longitudinal split 29 extends a sufficient distance down the first split tube 30 such that the resulting two halves of the first split tube, 30a and 30b extend beyond the split tube junction form 10 once the split tube is installed in the split tube junction form.

The first split tube 30 is then placed on the split tube junction form 10 such that the first longitudinal split 11 in the split tube is facing up, and the start 35 of the second longitudinal split 29 is placed under a first bottom retention tab 26a while the remainder of the tube lies atop the two arms 12a, 12b adjacent this first bottom retention tab. The two halves 30a and 30b of the first split tube 30 are then spread apart, and the edges formed by the second longitudinal split 29 in the first split tube 30 are placed under the two bottom retention tabs 26b, 26c nearest this first bottom retention tab 26a.

The two arms 12a, 12b adjacent this first bottom retention tab 26a are then bent upward and inward around the outside of the two halves 30a, 30b of the first split tube 30, until the top retention elements 18 of these two arms are located approximately above the first ends 13a of the arms 12a, 12b. The top retention elements 18 of these two arms 12a and 12b are then bent downward such that their top retention tabs 20 engage the edges formed by the first longitudinal split 11 in the first split tube 30, holding the two halves 30a, 30b of the first split tube in place. In this position, the fiber retainers 22 point inward, and once the optical fibers have been installed in the junction, assist in holding the optical fibers in place within the junction.

The process is then repeated with the second split tube 36.

The result is as shown in FIGS. 3 and 4a. A cross junction is formed from the two split tubes 30, 36, with the first longitudinal splits 11 of the split tubes facing upward, and the upper area of the split tube junction form 10 open. This allows optical fibers to be pushed through the first longitudinal splits 11 in the split tubes 30, 36, into the tubes formed by the two halves 30a, 36a and 30b, 36b of the split tubes, and also through the split tube junction form 10. Further, because the junction itself is formed from the split tubes 30, 36, the optical fibers are protected against being bent at a high angle, and are also protected against contact with other objects, either of which might damage the fragile fibers.

If the tubes formed by the halves 30a, 30b, 36a, 36b of the two split tubes 30, 36 are to extend any great distance beyond the split tube junction form 10, it may be desirable to splice additional split tubes (not shown) to their ends to reduce the likelihood of the optical fibers falling out of the tubes. Such a splice may be formed using the embodiments of the present invention shown in FIGS. 7a and 7b, or 8a and 8b as further described below.

In the alternative, if it is desired to have a cross-junction where all four of the resulting tubes are to extend some distance, a cross-junction may be formed using the split tube junction form 10, from four in-coming split tubes. As shown in FIG. 4b, four split tubes 100, 102, 104 and 106 may be installed in the split tube junction form 10 by providing the free end of each split tube with a second longitudinal split forming two halves at the free end of each split tube. Each half of each split tube is then overlapped with a half of an adjacent split tube and held in place by the split tube junction form 10 as described above. Thus, a first half 100a of a first split tube 100 is overlapped with a first half 102a of a second split tube 102 and held in place by the third arm 12c, a second half 102b of the second split tube 102 is overlapped with a first half 104a of a third split tube 104 and held in place by the fourth arm 12d, a second half 104b of the third split tube 104 is overlapped with a first half 106a of a fourth split tube 106 and held in place by the second arm 12b, and a second arm 106b of the fourth split tube 106 is overlapped with a second arm 100b of the first split tube 100 and held in place by the first arm 12a. In this manner, a true cross-junction in split tube is created with each split tube leaving the junction being intact with one side open, and the top of the junction also being open.

The split tube junction form 10 may also be provided with top closures located between the top retention elements 18 when the arms 12a–d are in their second positions, to more effectively retain the optical fibers in place within the split tube junction form. An example of such closures is shown on two of the fiber retainers 22 in FIG. 3, the fiber retainers being provided with flexible fingers 38 frictionally mounted on, and extending inwardly from the fiber retainers 22 when the arms 12a–d are in their second positions and the top retention elements 18 are bent downward. These flexible fingers 38 may be made of plastic or rubber and serve to more effectively retain the optical fibers in place within the split tube junction form 10 while still allowing the fibers to be pushed into the junction. Other closures such as flexible straps placed between opposing fiber retainers 22 may be used, though in such a case, the straps must be undone to allow insertion or removal of the optical fibers.

In addition to the cross configuration provided by the preferred embodiment of the split tube junction form 10 of the present invention as shown in FIGS. 1a through 4b, further embodiments of the split tube junction form may be adapted to provide a "Y" junction as shown in FIGS. 5a–d, a "T" junction as shown in FIGS. 6a–d, or may be adapted to provide a linear connection between two split tubes as shown in FIGS. 7a, 7b, 8a and 8b. It is to be understood that the present invention contemplates split tube junction forms adapted to provide other types of junctions, hexagonal, for example.

To create a "Y" joint using the junction form 40 shown in FIG. 5a, an end of a split tube 42 as seen in FIG. 5b having a first longitudinal split 44 is provided with a second longitudinal split (not shown). This split tube 42 is placed on the junction form 40 such that the start of the second longitudinal split is placed beneath a first bottom retention tab 46a. The two arms 48a and 48b adjacent this first bottom retention tab 46a are brought to their second positions, and their top retention elements 47 are bent downwards so as to engage the two halves 42a and 42b of the split tube 42 created by the two longitudinal splits. A half of a tube which has been cut in half longitudinally 49 is then placed adjacent to the two halves 42a and 42b of the split tube 42, and retained in place by bending the third arm 48c to its second position and bending its top retention element 47 downward.

Figure 5C:
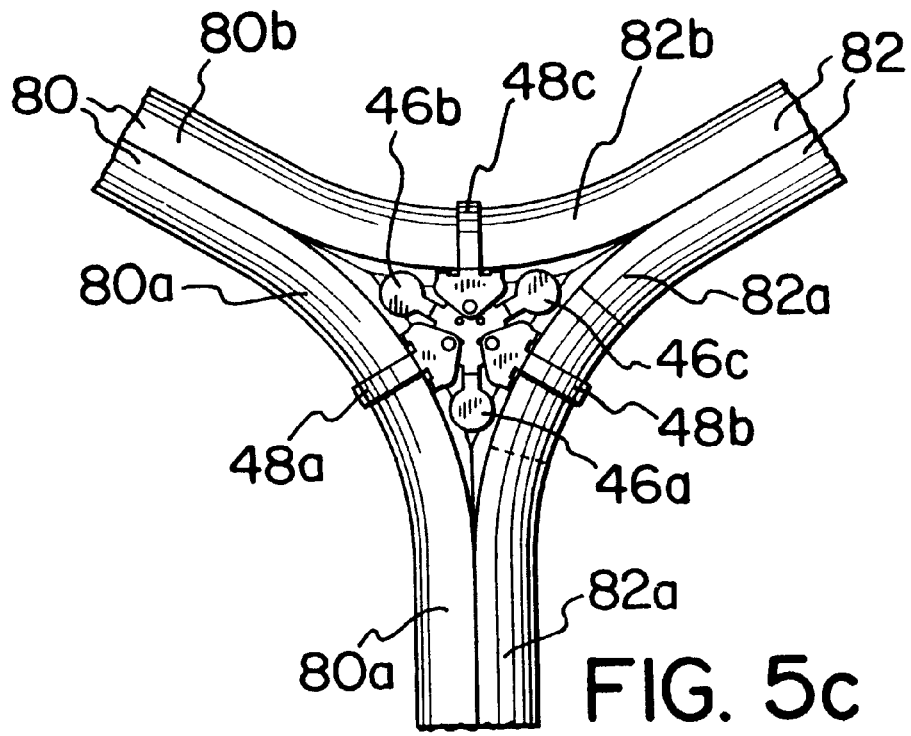
FIG. 5c is a top view of the split tube junction form of FIG. 5a with the arms in a second position and with split tubes installed therein in a different configuration to form a "Y" junction.

In the alternative, a "Y" joint may be created using the junction form 40 shown in FIG. 5a as shown in FIG. 5c. The end of a first split tube 80 is provided with a second longitudinal split (not shown) to form first and second halves 80a and 80b of the split tube. This first split tube 80 is then placed on the junction form 40 such that the start of the second longitudinal split is placed beneath a second bottom retention tab 46b. The two halves 80a and 80b of this first split tube 80 are spread apart and the first half 80a is placed above the first arm 48a while the second half 80b is placed above the third arm 48c. A second split tube 82 is likewise provided with a second longitudinal split (not shown) to form first and second halves 82a and 82b, and placed on the junction form 40 such that the start of the second longitudinal split is placed beneath a third bottom retention tab 46c. The two halves 82a and 82b of this second split tube are spread apart, with the first half 82a placed above the second arm 48b while the second half 82b is placed above the third arm 48c, overlapping the second arm 80b of the first split tube 80. The second halves 80b and 82b may be cut as shown in FIG. 5c, so as to avoid excessive overlap. The three arms 48a–c are then bent to their second positions, and their top retention elements 47 bent downwards so as to engage the split tubes 80 and 82.

Figure 5D:
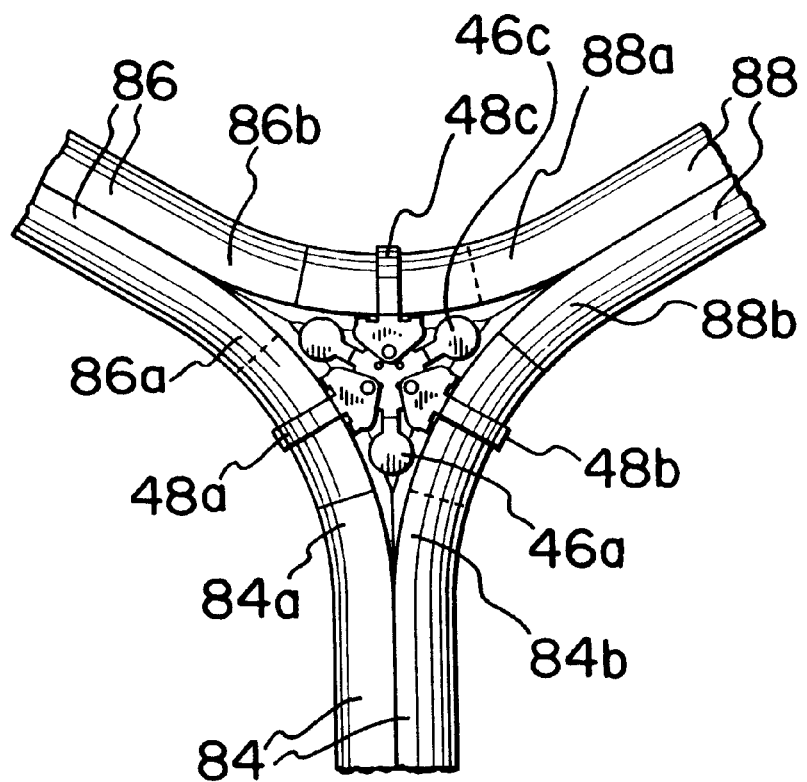
FIG. 5d is a top view of the split tube junction form of FIG. 5a with the arms in a second position and with split tubes installed therein in a further configuration to form a "Y" junction.

A further method of creating a "Y" joint using the junction form 40 of FIG. 5a is to have three split tubes 84, 86 and 88 coming into the junction as shown in FIG. 5d. A second longitudinal split is formed at the free end of each split tube forming two halves of each split tube. The first half 84a of a first split tube 84 is overlapped with a first half 86a of a second split tube 86 and held in place by the first arm 48a as described above. A second half 86b of the second split tube 86 is overlapped with the first half 88a of a third split tube 88 and held in place by the third arm 48c. Finally, a second half 88b of the third split tube 88 is overlapped with a second half 84b of the first split tube and is held in place by the second arm 48b. The manner of holding the halves of the split tubes in place using the arms are as described above, except that two halves of split tubes are being held in place by each arm instead of the usual one.

Figure 6A:
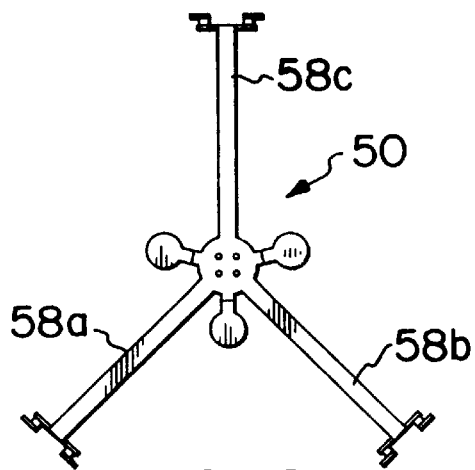
FIG. 6a is a top view of a split tube junction form according to yet another embodiment of the invention with the arms in a first position.
Figure 6B:
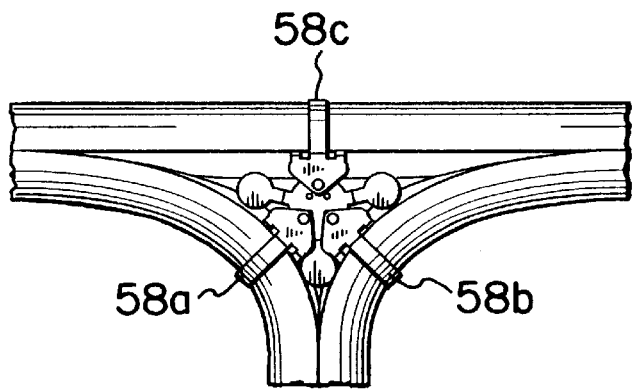
FIG. 6b is a top view of the split tube junction form of FIG. 6a with the arms in a second position and with split tubes installed therein to form a "T" junction.
Figure 6C:
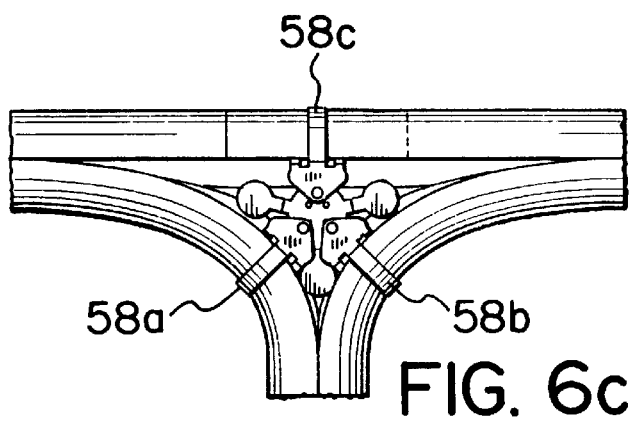
FIG. 6c is a top view of the split tube junction form of FIG. 6a with the arms in a second position and with split tubes installed therein in a different configuration to form a "T" junction.
Figure 6D:
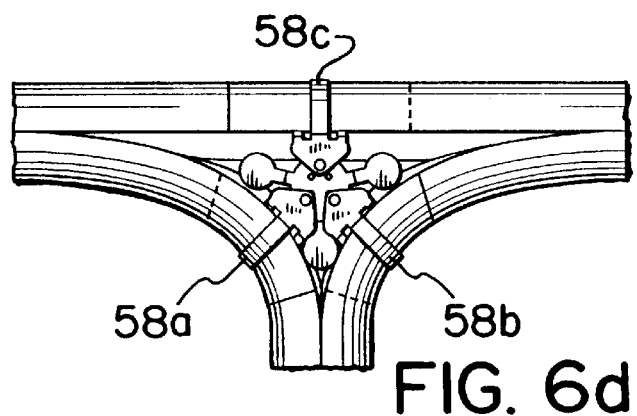
FIG. 6d is a top view of the split tube junction form of FIG. 6a with the arms in a second position and with split tubes installed therein in a further configuration to form a "T" junction.

A "T" joint may be created using the junction form 50 shown in FIG. 6a. This junction form 50 differs from junction form 40 used to create "Y" junctions only insofar as the angles between the arms are different. With the junction form 40 shown in FIG. 5a, the angle between each of the arms is approximately 120°, while with junction form 50 shown in FIG. 6a, the angle between a first and second arms 58a and 58b, is approximately 90° while the angle between each of these two arms and a third arm 58c is approximately 135°. A "T" joint, as shown in FIGS. 6b, 6c and 6d may be created using the junction form 50 shown in FIG. 6a in the same manner as described above with respect to the "Y" joint.

To create a linear joint using the junction form 60 shown in FIG. 7a, having a base 61, a left side 60a and a right side 60b, an end of a first split tube 62 having a first longitudinal split 64 is provided with a second longitudinal split (not shown). This split tube 62 is placed on a first end 66 of the junction form 60 with the edges formed by the second longitudinal split placed beneath the four bottom retaining tabs 68a–d at the first end of the junction form. The two arms 70a and 70b at this first end 66 of the junction form 60 are then bent to their second positions and their top retaining elements 67 bent downwards so as to engage the two halves 62a and 62b of the first split tube 62 formed by the two longitudinal splits. The process is then repeated with a second split tube 72 at a second end 74 of the junction form.

A linear lap joint may also be created using the junction form 90 shown in FIG. 8a. The lap joint is created as shown in FIG. 8b as described above with respect to FIGS. 7a and 7b except that only two arms are used, and the two halves of the split tubes are overlapped to be held in place by these two arms.

The linear joints described above with reference to FIGS. 7b and 8b may also be created without providing the two split tubes with second longitudinal splits, and placing the split tubes on the base of the split tube junction form without using the bottom retaining elements.

Although the split tube junction forms of the present invention have been described as having means for mounting the split tube junction form to another surface, it is to be understood that such mounting means are not essential.

Although the means for mounting the split tube junction forms to another surface is described as being the placement of screws, nails and the like placed through holes in the base, it is to be understood that other mounting means may be used, VELCRO™ mechanical fasteners, for example.

Although the split tube junction forms of the present invention have been described as being used to provide shielded junctions for optical fibers, it is to be understood that it may also be used to provide shielded junctions for other cables, copper wires for example.

Although the split tube junction forms of the present invention have been described as being used to provide junctions for split tube, it is to be understood that it may also be used to provide junctions for other flexible conduits, closed tube for example. When used with closed tube, the closed tubes are first provided with two opposing longitudinal splits at an end, and are then mounted in the split tube junction form as described above. Of course, when used with closed tube, although the fibers may still be pushed into the junction, they cannot be pushed into the original tubes.

Although the top and bottom retainers of the split tube junction forms of the present invention have been described as consisting of the top and bottom retention tabs in cooperation with the arms, it is to be understood that other structure suitable for engagement of a split tube may be used, clips or clamps for example.

Although the split tube junction forms of the present invention have been illustrated as being used to provide junctions for tubes of circular cross-section, it is to be understood that the split tube junction form may also be used to provide junctions for tubes of other cross-sections, square for example, or to provide junctions for two or more tubes having different cross-sections.

Although the split tube junction forms of the present invention have been illustrated as being used to provide junctions for tubes of the same size, it is to be understood that the split tube junction form may also be used to provide junctions for tubes of differing sizes by simply having longer or shorter arms to accommodate the different tube sizes.

Although the arms of the split tube junction forms of the present invention have been described as being semi-rigid, these arms may also be flexible, or elastic. Of course, if the arms are flexible, or elastic, the arms would not be able to retain the split tubes in an open position without further modifications.

According to another embodiment, the invention provides a method of making a cross junction using two flexible split tubes by performing the steps of providing a second longitudinal split at the end of each of the two split tubes radially opposite the first longitudinal split already formed in the split tubes creating two halves of each split tube, placing and retaining one half of the first split tube against a half of the second split tube, and placing and retaining the other half of the first split tube against the other half of the second split tube, using any appropriate means adapted to retain the halves of the split tubes against each other as described. Such means may include junction forms described herein, or other retention means such as stitching, clamping, or gluing.

Numerous modifications and variations of the present invention are possible in light of the above teachings. It is therefore to be understood that within the scope of the appended claims, the invention may be practised otherwise than as specifically described herein.

What is claimed is:

1. A junction form adapted to form a junction in flexible conduits, each one of said flexible conduits having a respective first longitudinal split at an end, the junction form comprising:

at least three arms extending radially from an intersection of said arms, each arm having a first end near the intersection, and a second end remote from said intersection, each of said arms being bendable from a first position in which the arm extends outward from said intersection, to a second position in which the second end of the arm is substantially located above the first end; and said second end of each arm being provided with a top retainer for engaging an edge formed by the first longitudinal split in one of said flexible conduits, whereby said junction may be formed by placing the flexible conduits on the arms of the junction form with the first longitudinal splits facing up, bending the arms to their second positions and positioning the top retainers to engage the edges formed by the first longitudinal splits in the flexible conduits.

2. The junction form of claim 1 wherein the arms are semi-rigid.

3. The junction form of claim 2 wherein each one of said flexible conduits also has a respective second longitudinal split at an end, the junction form further comprising a plurality of bottom retainers, each one of said bottom retainers being adapted to engage an edge formed by the second longitudinal split in one of said flexible conduits.

4. The junction form of claim 2 wherein the first longitudinal split in each one of said flexible conduits extends throughout an entire length of the flexible conduit.

5. The junction form of claim 2 wherein each one of said flexible conduits also has a respective second longitudinal split at an end, the junction form further comprising a plurality of bottom retainers, each one of said bottom retainers being adapted to engage an edge formed by the second longitudinal split in one of said flexible conduits.

6. The junction form of claim 5 wherein each top retainer comprises at least one top retaining tab.

7. The junction form of claim 6 wherein the top retaining tabs extend downward and outward from the second ends of the arms when the arms are in their second positions.

8. The junction form of claim 7 wherein each bottom retainer comprises at least one bottom retaining tab.

9. The junction form of claim 8 wherein the bottom retaining tabs extend upward and outward from the intersection of the arms.

10. The junction form of claim 9 further comprising at least one bottom retaining tab extending from the intersection of the arms between each pair of adjacent arms.

11. The junction form of claim 10 further comprising mounting means for mounting the junction form to a surface.

12. The junction form of claim 11 further comprising top closures extending inward from the second ends of the arms when the arms are in their second positions.

13. The junction form of claim 12 wherein the number of arms is three.

14. The junction form of claim 12 wherein the number of arms is four.

15. A junction form for joining a first and second flexible conduit each having at least a first longitudinal split at an end, comprising:

a base having a left side and a right side;

at least one arm extending outward from each of the left side and right side of said base;

each arm having a first end attached to the base, and a second end remote from the base, each of said arms being bendable from a first position in which the arms extend outward from said base, to a second position in which the second end of the arm is substantially located above the first end; and said second end of each arm being provided with a top retainer for engaging an edge formed by the first longitudinal split in one of said first and second flexible conduits, whereby with the ends of the first and second flexible conduits placed on the base with the first longitudinal split of each flexible conduit facing up, the arms may be bent to their second positions and their top retainers positioned to engage edges formed by the first longitudinal splits in the flexible conduits.

16. The junction form of claim 15 wherein the arms are semi-rigid.

17. The junction form of claim 16 further comprising at least one bottom retaining tab extending from the base on either side of each arm.

* * * * *